United States Patent [19]

Thor

[11] 4,433,767
[45] Feb. 28, 1984

[54] POWER TRANSMISSION MECHANISM

[76] Inventor: Charles C. Thor, Box 654, Hutchinson, Minn. 55350

[21] Appl. No.: 254,750

[22] Filed: Apr. 16, 1981

Related U.S. Application Data

[63] Continuation of Ser. No. 57,601, Jul. 16, 1979, abandoned.

[51] Int. Cl.³ .................. F16D 25/08; F16D 25/12
[52] U.S. Cl. .......................... 192/67 P; 192/67 R; 192/85 C; 192/86; 192/108; 248/601; 248/623
[58] Field of Search ............... 192/67 R, 67 P, 85 C, 192/86, 108; 248/623, 599, 600, 601, 622; 308/58; 464/136, 119

[56] References Cited

U.S. PATENT DOCUMENTS

| | | | |
|---|---|---|---|
| 312,911 | 2/1885 | Simmerly | 192/67 P |
| 1,324,898 | 12/1919 | Hopcraft | 464/119 X |
| 2,135,902 | 11/1938 | Leister | 308/58 |
| 2,248,332 | 7/1941 | Budelier et al. | 56/25 |
| 2,253,431 | 8/1941 | Johansen | 192/67 R |
| 2,850,122 | 9/1958 | Alishouse | 192/86 R |
| 3,337,245 | 8/1967 | Prange | 192/67 R X |
| 3,362,235 | 1/1968 | Wirth et al. | 74/11 |
| 3,702,639 | 11/1972 | Womble et al. | 192/67 R X |
| 3,727,847 | 4/1973 | Nelson | 192/67 R X |
| 3,948,369 | 4/1976 | Dodd | 192/67 R |
| 4,003,219 | 1/1977 | Stull | 92/117 A X |

FOREIGN PATENT DOCUMENTS

| | | | |
|---|---|---|---|
| 954768 | 12/1956 | Fed. Rep. of Germany | 192/85 C |
| 956460 | 2/1957 | Fed. Rep. of Germany | |
| 2621162 | 11/1977 | Fed. Rep. of Germany | |

Primary Examiner—Rodney H. Bonck
Attorney, Agent, or Firm—Merchant, Gould, Smith, Edell, Welter & Schmidt

[57] ABSTRACT

A drive shaft (30), adapted to be connected to the power takeoff shaft (14) of a tractor, comprises a longitudinally extensible shaft (33) including a tapered head (34) that is movable into and out of meshing engagement with a correspondingly shaped socket (50) on the outer end portion (49) of a driven shaft (48). The driven shaft is carried by an implement (27) and includes an inner end portion (49) connected to the outer, socket equipped end portion by a universal joint (51), the inner end portion being adapted for connection to a mechanism to be driven. A coil compression spring (53), loosely encompassing the universal joint, has opposite ends engaging flanges (54,55) on the inner and outer end portions of the driven shaft to yieldingly hold the driven shaft portions in alignment. A bearing (56) for the outer end portion of the driven shaft is mounted on the implement by mechanism including a spring (60), to enable turns of the tractor and implement.

6 Claims, 7 Drawing Figures

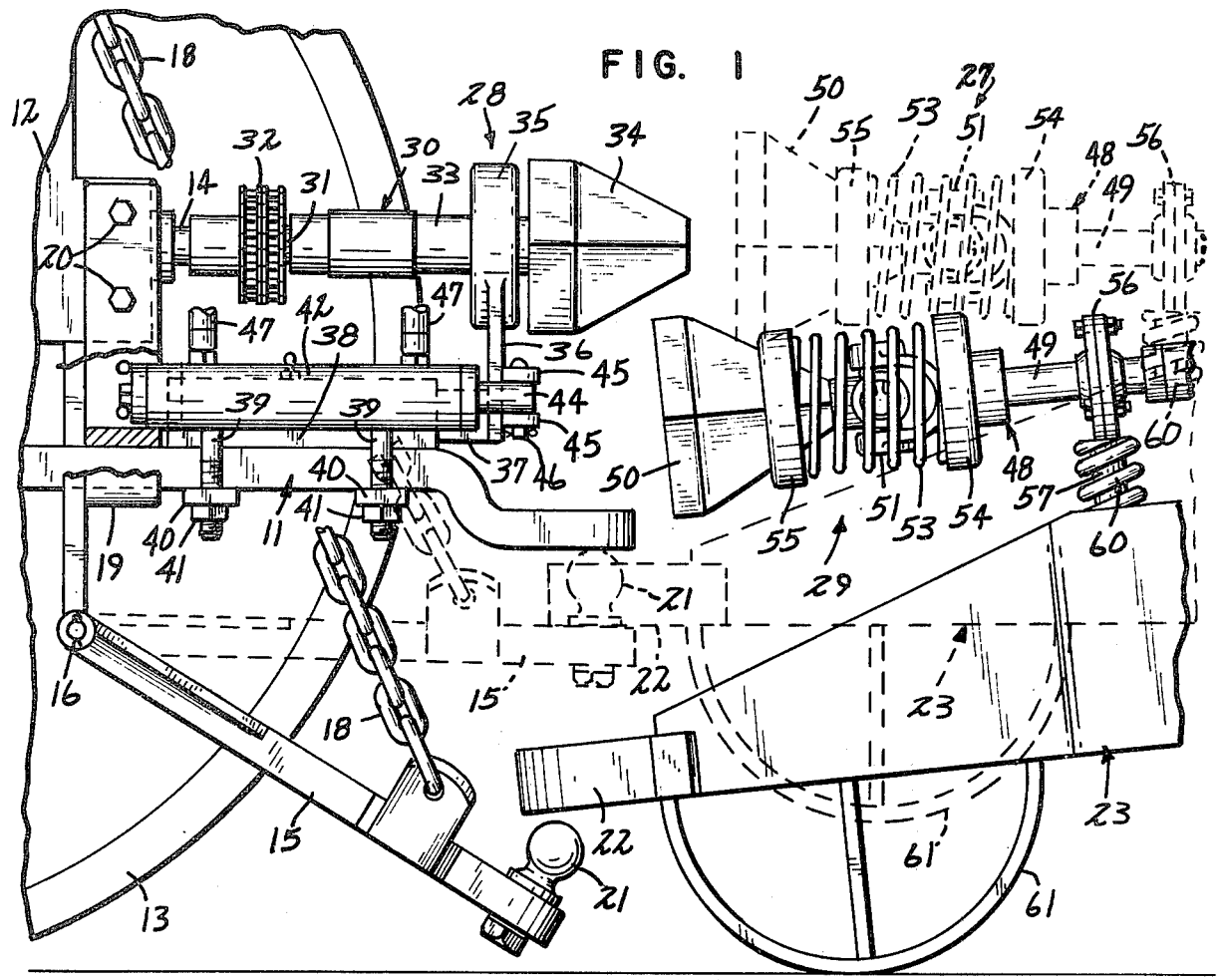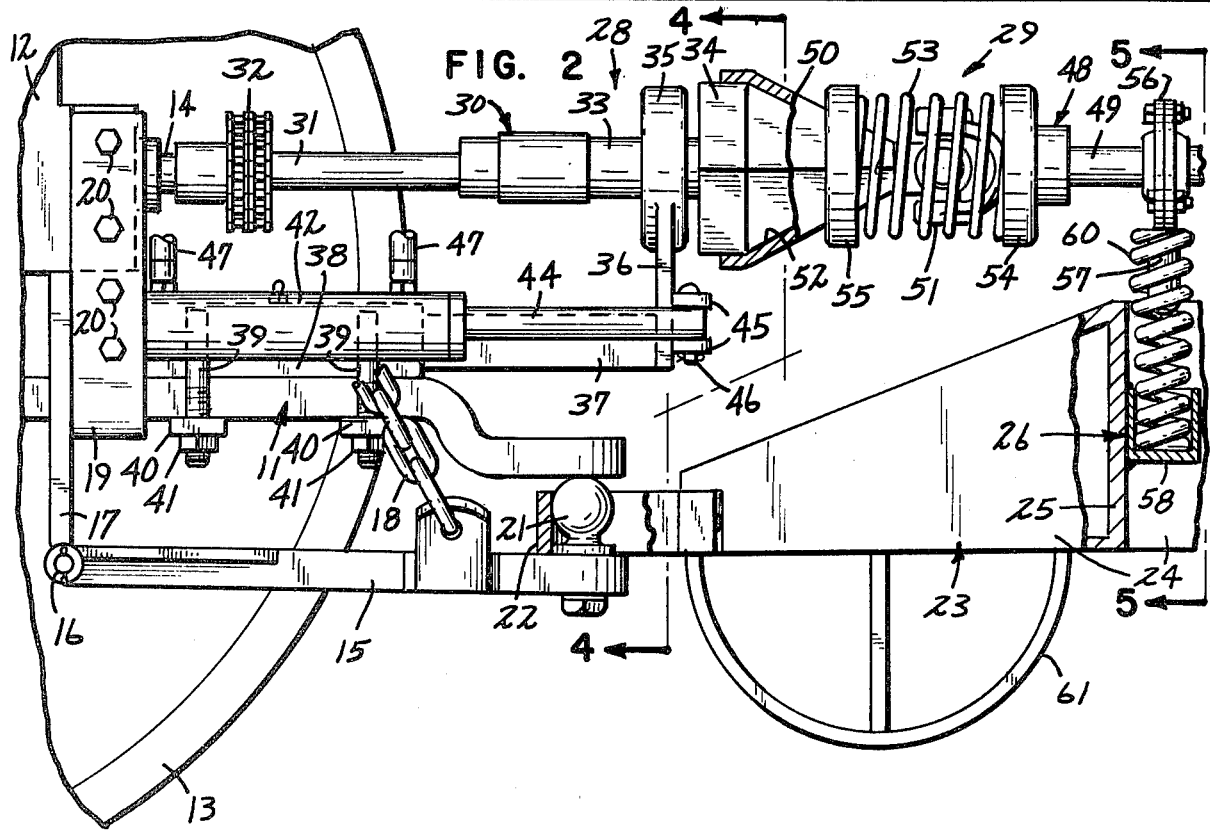

POWER TRANSMISSION MECHANISM

This is a continuation of application Ser. No. 057,601, filed July 16, 1979 and now abandoned.

BACKGROUND OF THE INVENTION

This invention relates generally to power transmission mechanisms and more particularly to such mechanisms as are used to transfer rotation from a power takeoff shaft of a prime mover, such as a tractor, to a rotary shaft on an implement connected to the tractor for movement therewith.

SUMMARY OF THE INVENTION

The mechanism of this invention provides for rapid coupling and uncoupling between driving and driven portions thereof without disengaging the implement from the tractor. One of the driving and driven portions of the mechanism includes a universal joint and a movable bearing permitting pivotal movement between a tractor and the towed implement, and a spring is utilized to yieldingly hold a shaft on one of the driving and driven portions in a position to be operatively engaged by or coupled to a shaft on the other portion when the driving and driven portions are mounted on the tractor and implement and when the implement is coupled to the tractor.

The power transmission mechanism of this invention involves a longitudinally extensible and retractable first shaft having an outer end portion including a longitudinally outwardly tapering coupling head, and an inner end portion. A second shaft has an inner end portion, an outer end portion, and a universal joint connecting said outer end portion to said inner end portion. The inner end portions of said shafts are arranged to be connected, on to a prime mover for rotation, and the other to an apparatus to be driven. The outer end portion of said second shaft comprises a longitudinally inwardly tapering coupling socket for interfitting reception of the tapering head of said first shaft. Yielding means urges said inner and outer end portions of the second shaft toward axial alignment with each other, and means is provided for imparting extending and retracting movements to said first shaft to move said head into and out of interfitting engagement with said socket.

BRIEF DESCRIPTION OF THE DRAWINGS

FIG. 1 is a fragmentary view in side elevation of the rear end portion of a tractor and the front end portion of an implement, portions of the transmission mechanism of this invention being mounted on the tractor and implement; respectively FIG. 2 is a view corresponding to FIG. 1 but showing different positions of some of the parts, some parts being broken away and some parts being shown in section;

DETAILED DESCRIPTION OF THE PREFERRED EMBODIMENT

Figure 3:
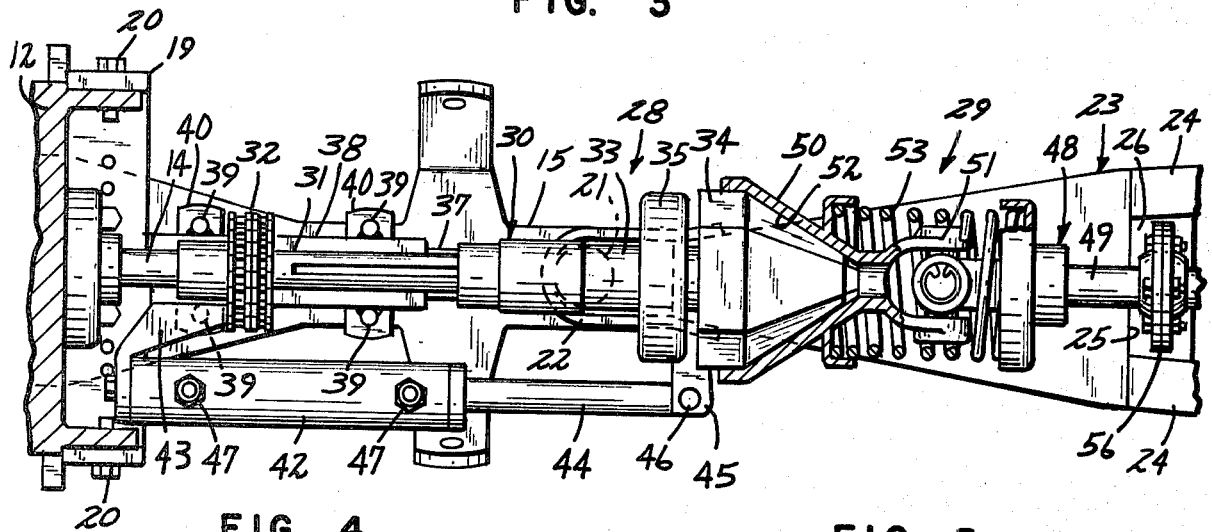
FIG. 3 is a fragmentary view in top plan of FIG. 2, some parts being broken away and some parts being shown in section.

The rear end of a prime mover in the nature of a conventional tractor is shown as including a frame or drawbar portion 11, a transmission housing 12, a supporting wheel 13, a power takeoff shaft 14, a second drawbar 15 pivotally connected, as at 16, to a tractor frame portion 17. The drawbar 15 is adapted to be raised and lowered, as shown by dotted and full lines in FIG. 1, by well-known mechanism, not shown, including a pair of link chains 18. The tractor frame includes a generally U-shaped member 19 that is rigidly secured to the transmission housing by machine screws or the like 20.

The rear end of the drawbar 15 is provided with a hitch ball 21 that is receivable in a socket member 22 at the front end of a hitch bar 23 shown fragmentarily as including a pair of spaced side members 24 and a cross member or partition 25 rearwardly spaced from the socket member 22 and having a receptacle or cup 26 welded thereto. The hitch bar 23 may be assumed to be connected to any suitable mobile implement 27 having mechanism to which rotary movement is to be imparted. Neither the tractor, nor the implement, not shown, in and of themselves comprise the instant invention. Hence, in the interest of brevity, further showing and description thereof is omitted.

Figure 4:
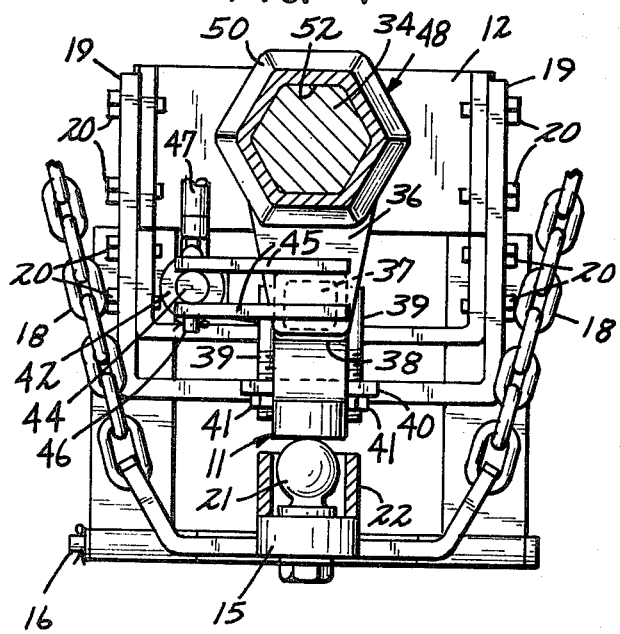
FIG. 4 is a fragmentary transverse section taken on the irregular line 4—4 of FIG. 2.

The transmission mechanism of this invention comprises separable driving and driven section 28 and 29 the former of which is carried by the tractor, and the latter of which is carried, at least in part, by the hitch bar 23. The driving section 28 comprises a longitudinally extensible and retractable drive shaft 30 that includes an inner end portion 31 that is connected to the power takeoff shaft 14 by a coupling 32, and an outer end portion 33 that is telescopically received over the inner end portion 31 and keyed thereto for rotation therewith and for axial sliding movements with respect thereto. The outer end shaft portion 33 is provided at its extreme end with a longitudinally outwardly tapering cross sectionally polygonal drive head 34. For the purpose of the present example, the drive head 34 is shown as being cross sectionally hexagonal, see particularly FIG. 4.

The outer end portion 33 of the drive shaft 30 is journaled in a bearing 35 having a depending leg 36 that is rigidly secured at its lower end to the rear end of an elongated bar 37 that extends in a direction parallel to the drive shaft 30 and is mounted for longitudinal sliding movement in an elongated guide member 38 having depending studs 39 at its opposite sides, the studs 39 being equipped with clamping plates 40 and clamping nuts 41 by means of which the guide member 38 is rigidly secured to the frame portion or drawbar 11.

Means for imparting extending and retracting movements to the outer end portion 33 of the shaft 30, and the drive head 34 thereof, comprises a fluid pressure cylinder 42 that is mounted at one end by suitable means, such as a bracket 43 to the front or inner end of the guide member 38, and a cooperating piston rod 44 pivotally connected at its outer end to a pair of fingers 45 that are welded to the leg 36 and which project laterally outwardly therefrom, the pivotal connection between the piston rod 44 and fingers 45 comprising a pivot pin 46. The cylinder 42 is adapted to be connected in a conventional fluid system including a pump, not shown, by fluid conduits 47 connected to opposite end portions of the cylinder 42.

The driven section 29 of the transmission mechanism comprises a driven shaft 48 having an inner end portion 49 and an outer end portion 50, the end portions 49 and 50 being connected together for common rotation by a universal coupling 51. As shown, the outer end portion 50 is formed to provide a longitudinally inwardly tapering cross sectionally polygonal socket 52 for interfitting reception of the tapered drive head 34 of the driving section 28. The driven shaft end portions 49 and 50 are yieldingly held in axial alignment by a coil compression spring 53 that encompasses the universal coupling 51 and that has its opposite ends in abutting engagement with a pair of cup-shaped flanges 54 and 55 that are fixed on the shaft end portions 49 and 50, respectively. The inner end portion 49 of the shaft 48 is journaled in a bearing 56 of the self-sligning type, and is to be connected to mechanism, not shown, which may be assumed to be disposed rearwardly of the hitch bar 23. The bearing 56 is mounted to a normally generally vertical leg 57 that extends downwardly from the bearing 56. A coil compression spring 60 is received about the leg 57 and has a first end connected to the bearing 56 and a second end received within the cup 26. The second end of the spring 60 cntacts a bottom wall 58 of the cup 26. The spring 60 thus connects the drive shaft 48 to the hitch bar 23 while permitting a certain amount of relative motion between the hitch bar 23 and the drive shaft 48.

Like the hitch bar or tongue on many mobile implements, the hitch bar 23 is provided with a supporting shoe 61 that holds the socket member 22 in upwardly spaced relation to the ground when the implement is disconnected from the tractor. This enables the hitch ball 21 to be disposed below the level of the socket member 22, as shown in full lines in FIG. 1, when it is desired to connect or disconnect the implement from the tractor. As shown by dotted lines in FIG. 1, raising of the second drawbar 15 causes the hitch ball 21 to enter the socket element 22 and to engage the bottom surface of the frame portion or drawbar 11 at its rear end portion, to prevent the hitch bar 23 from being disconnected from the tractor. When the hitch bar 23 is raised to its dotted line position of FIG. 1, it will be noted that the transmission driven section 29 is raised to a position wherein the drive head 34 can be extended into driving engagement with the socket 52 of the driven section 29. This is accomplished by introducing fluid under pressure to one end of the cylinder 42 to cause extending movement to be imparted to the piston 44. When it is desired to disconnect the implement from the tractor, it is only necessary to reverse the flow of fluid in the cylinder 42 to retract the piston 44 and the drive head 34 from the socket 52, after which the second drawbar 15 is lowered to its full line position of FIG. 1.

Figure 5:
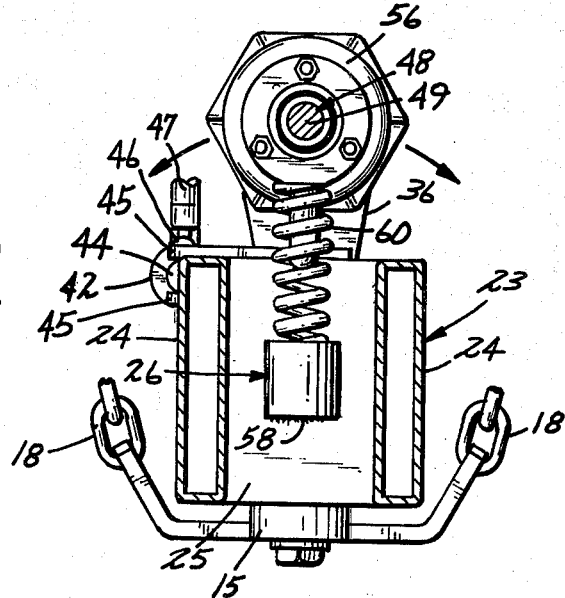
FIG. 5 is a fragmentary transverse section taken on the line 5—5 of FIG. 2.

It will be noted that the vertical axis of the hitch ball 21, in its operative position, is spaced from the vertical axis of the universal coupling 51 in a direction generally longitudinally of the direction of movement of the tractor and implement. Thus, when the tractor and implement are moved in a curve, or around a corner, that portion of the transmission mechanism that is disposed rearwardly of the vertical axis of the hitch ball 21 swings laterally outwardly. When this occurs, a pivotal motion of the shaft 48 is permitted by the spring 60, as illustrated by the arrows in FIG. 5.

Figure 7:
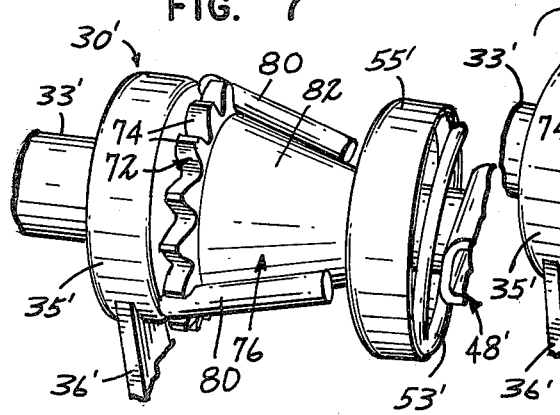
FIG. 7 is a perspective view of the mechanism illustrated in FIG. 6, however, shown in a connected state.
Figure 6:
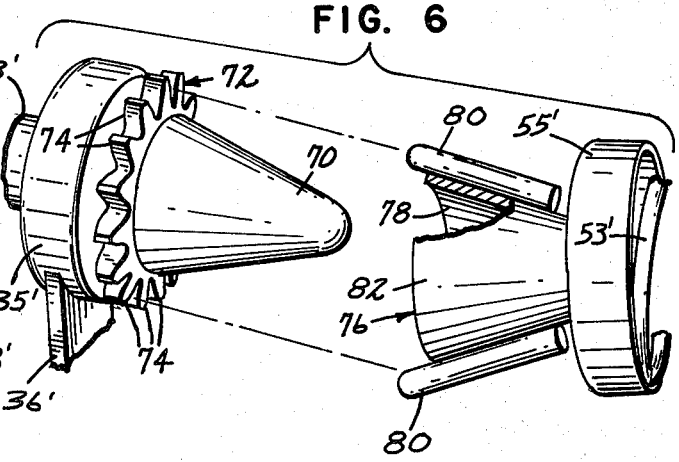
FIG. 6 is a perspective view of a second embodiment of a mechanism for coupling the first shaft to the second shaft, with the mechanism shown in an unconnected state.

There is illustrated in FIGS. 6 and 7 another embodiment of a coupling mechanism for coupling together the driving and driven sections 28, 29. Portions of the apparatus which are illustrated in FIGS. 6 and 7 and which are similar to portions of the apparatus illustrated in FIGS. 1–5 will be indicated by like primed numerals.

A generally cone-shaped drive head 70 forms the extreme outer end of the shaft portion 33'. A gear or sprocket wheel 72 is attached to the base of the drive head 70. The sprocket wheel 72 has a plurality of teeth 74 extending radially outward along its outer circumference.

The driven shaft 48' has an outer end portion 76 which has an inner surface 78 shaped to receive the cone-shaped drive head 70. One or more engagement fingers 80 are secured to the outer surface 82 of the outer end portion 76. The fingers 80 have distal ends which extend beyond the outermost extent of the end portion 76. As seen in FIG. 7, the distal ends of the fingers 80 are each received between a pair of adjacent teeth 74 of the sprocket wheel 72. In this manner, the drive and driven sections of the apparatus are connected together.

While I have shown and described a commercial embodiment of my power transmission mechanism, it will be understood that the same is capable of modification, and that modification may be made without departure from the spirit and scope of the invention, as defined in the claims.

I claim:
1. Power transmission mechanism comprising:
 (a) a longitudinally extensible and retractable driving shaft having an outer end portion including a longitudinally outwardly tapering coupling head and an inner end portion;
 (b) a driven shaft having an inner end portion, an outer portion, and a universal joint connecting said outer end portion to said inner end portion;
 (c) said inner end portions of said shafts being arranged to be connected, one to a prime mover for rotation, and the other to an apparatus to be driven;
 (d) said outer end portion of said driven shaft comprising a longitudinally inwardly tapering coupling socket for interfitting reception of the tapered head of said first shaft;
 (e) yielding means urging said inner and outer end portions of the driven shaft toward axial alignment with each other;
 (f) and means for imparting extending and retracting movements to said driving shaft to move said head into and out of interfitting driving engagement with said socket,
 wherein said coupling head has a generally circular cross-sectional configuration and a sprocket element having a plurality of teeth is attached to the outer surface of the coupling head adjacent its widest end, and wherein said coupling socket has a generally circular cross-sectional configuration and at least one engagement finger extending from said coupling socket for reception between an adjacent pair of said teeth.

2. A power transmission mechanism comprising:
 (a) a longitudinally extensible and retractable drive shaft having an other end portion including a longitudinally outwardly tapering cross sectionally round drive head, a sprocket having a plurality of teeth attached to an outer surface of said drive head, and an inner end portion arranged to be connected for rotation to a prime mover;

(b) a driven shaft having an inner end portion arranged to be connected to a driven apparatus, an outer end portion and a universal joint connecting said outer end portion to said inner end portion;

(c) said outer end portion of the driven shaft comprising a longitudinally inwardly tapering cross-sectionally round socket for mating reception of the tapered head of said drive shaft, and at least one engagement finger extending from said socket and having a distal end for reception between an adjacent pair of said teeth;

(d) yielding means urging said inner and outer end portions of the driven shaft toward axial alignment with each other;

(e) and means for imparting extending and retracting movments to said outer drive shaft end portion to move said head into and out of interfitting engagement with said socket.

3. The power transmission mechanism defined in claim 2, further including a pair of radially outwardly projecting circumferential flanges each on a different one of said driven shaft portions, said yielding means comprising a coil compression spring encompassing said universal joint and having opposite ends abutting respective ones of said flanges.

4. The power transmission mechanism defined in claim 2, further including a drive shaft bearing journaling said drive shaft outer end portion, an elongated bar supporting said drive shaft bearing, a guide member mounting said bar in spaced parallel relation to said drive shaft and for extending and retracting movements with said outer end portion thereof, and means for mounting said guide member on said prime mover.

5. The power transmission mechanism defined in claim 4 in which said means for imparting extending and retracting movements to said outer drive shaft end portion comprises a fluid pressure cylinder and a cooperating piston rod one adapted to be connected to said prime mover and the other being operatively connected to said elongated bar.

6. The power transmission mechanism defined in claim 2, further including a driven shaft bearing journaling said driven shaft inner end portion, a normally generally vertical leg extending downwardly from said driven shaft bearing, spring means received about said leg and having a first end connected to said driven shaft bearing and a second end supported by a portion of an implement moved by said prime mover whereby said spring permits pivoting motion of said driven shaft bearing means relative to said implement.

* * * * *

UNITED STATES PATENT AND TRADEMARK OFFICE
CERTIFICATE OF CORRECTION

PATENT NO. : 4,433,767
DATED : February 28, 1984
INVENTOR(S) : Charles C. Thor

It is certified that error appears in the above—identified patent and that said Letters Patent is hereby corrected as shown below:

Column 1, line 37, "on" should be --one--;

Column 1, line 53, ";respectively" should be --respectively;--;

Column 2, line 32, "section" should be --sections--;

Column 3, line 18, "self-sligning" should be --self-aligning--;

Column 3, line 26, "cntacts" should be --contacts--;

Column 4, line 65, "other" should be --outer--;

Column 5, line 20, "movments" should be --movements--.

Signed and Sealed this

Twenty-sixth Day of June 1984

[SEAL]

Attest:

GERALD J. MOSSINGHOFF

Attesting Officer

Commissioner of Patents and Trademarks